Oct. 13, 1964   R. J. MILLENAAR ETAL   3,152,359
SAUSAGE LINK EJECTOR APPARATUS
Filed Jan. 9, 1963   6 Sheets-Sheet 3

INVENTORS
RICHARD J. MILLENAAR
AND EDMUND G. BLAIR
BY Cromwell, Greist and Warden
ATTORNEYS.

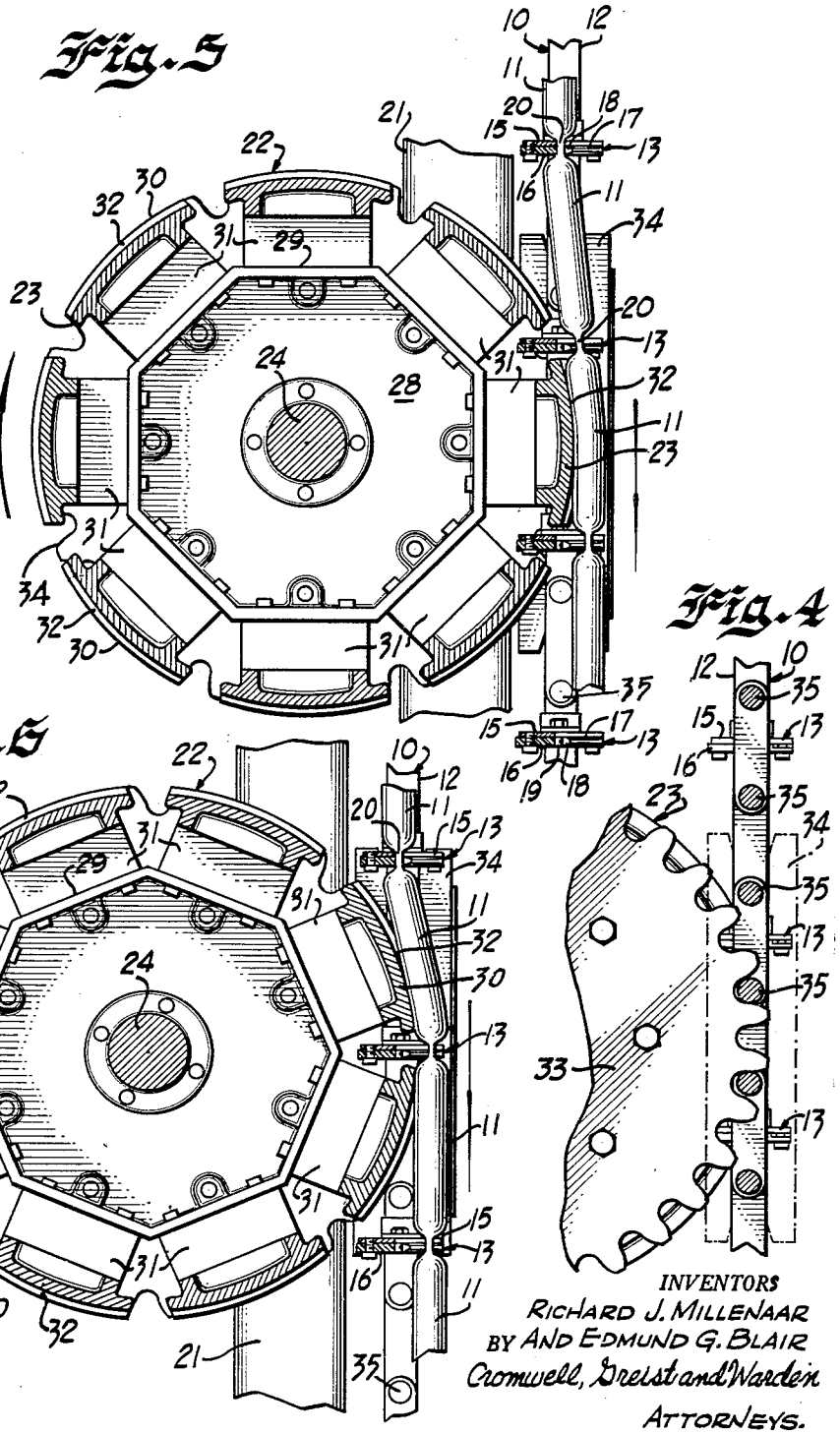

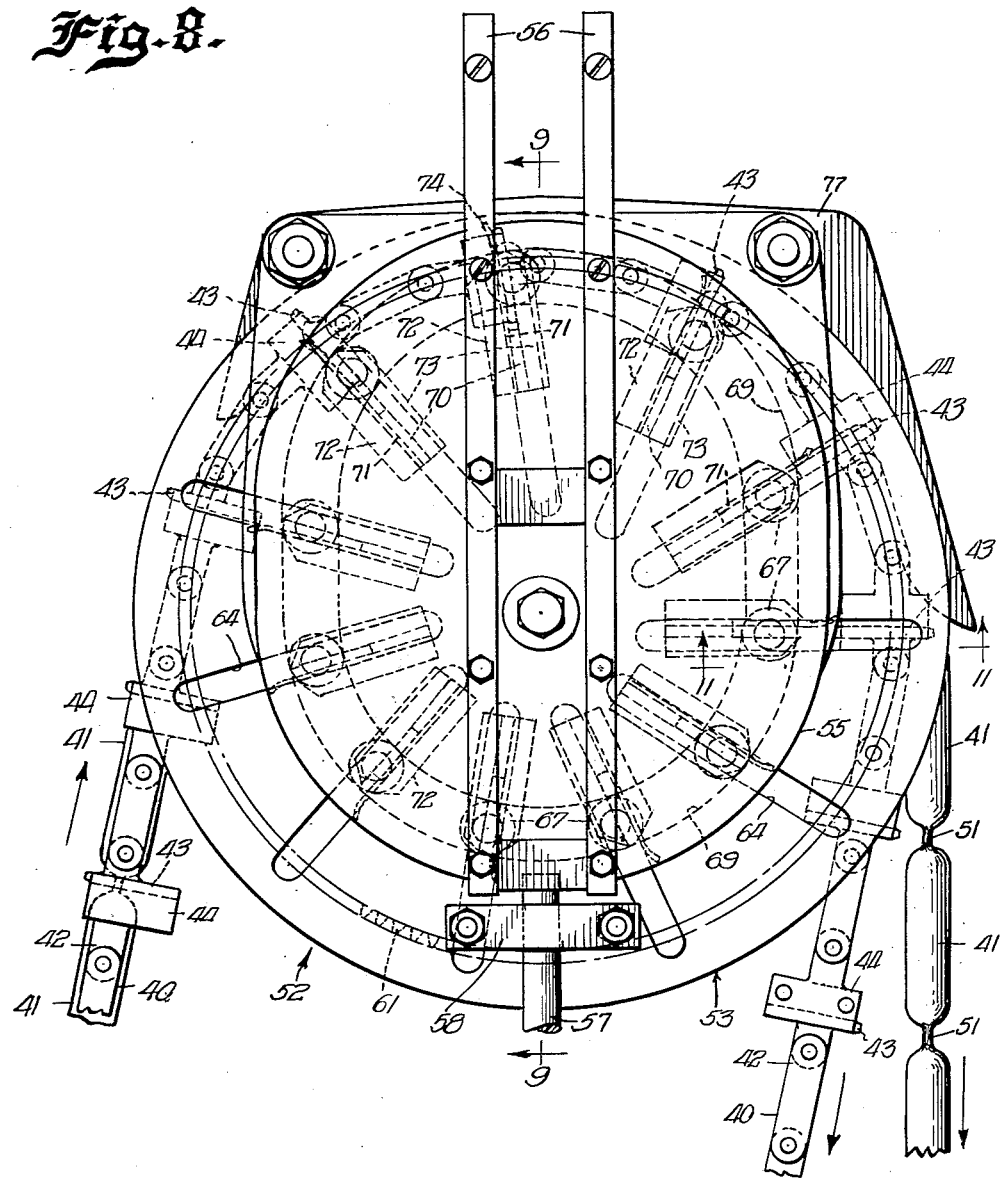

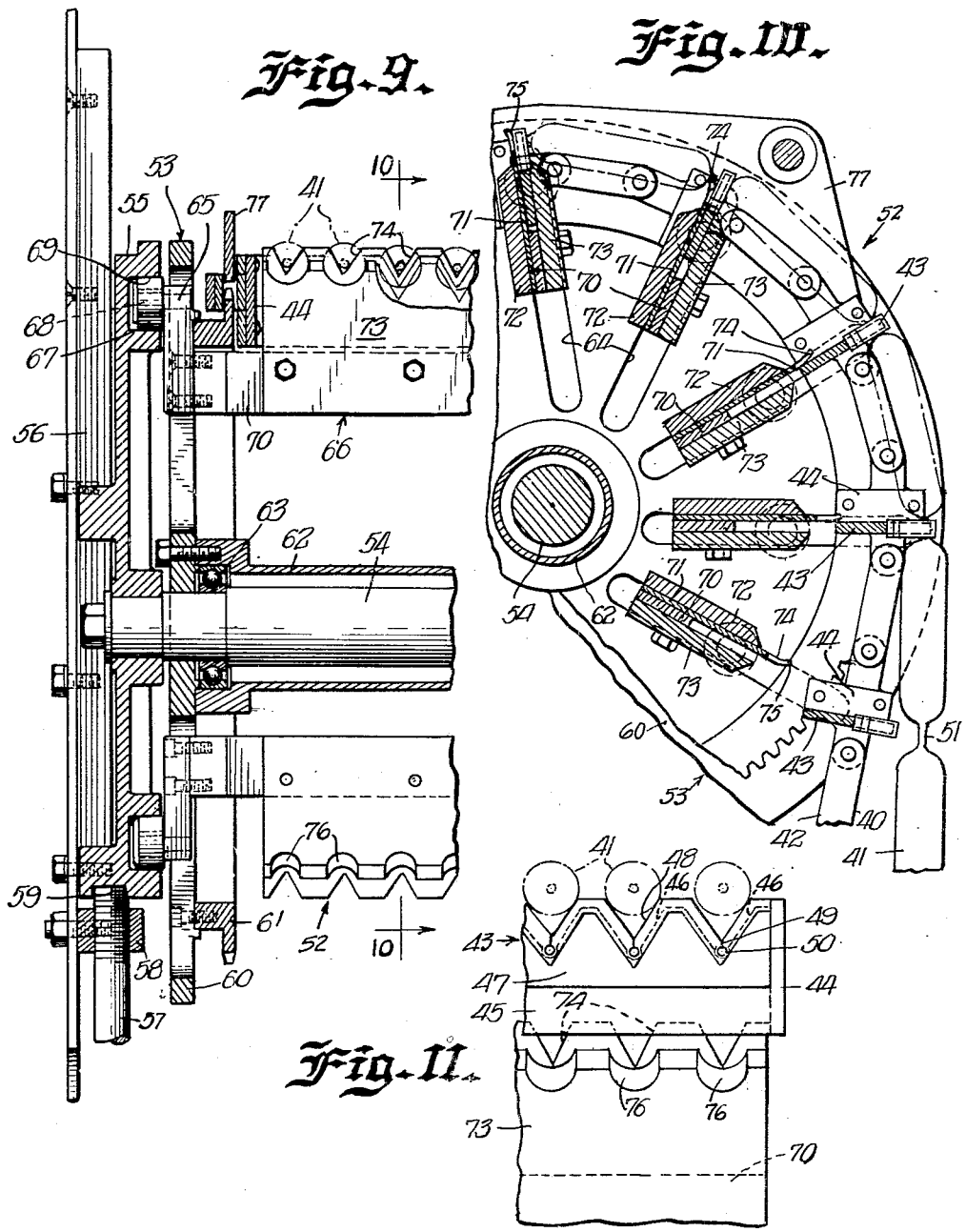

United States Patent Office 3,152,359
Patented Oct. 13, 1964

3,152,359
SAUSAGE LINK EJECTOR APPARATUS
Richard J. Millenaar, Charlottesville, Va., and Edmund G. Blair, deceased, late of Madison, Wis., by Minnie T. Blair, executrix, Madison, Wis., assignors to Oscar Mayer & Co., Inc., Chicago, Ill., a corporation of Illinois
Filed Jan. 9, 1963, Ser. No. 251,465
7 Claims. (Cl. 17—34)

This invention relates to apparatus for use in the manufacture of sausages wherein lengths of filled or stuffed casing are divided into links by constricting the casing at intervals corresponding to the desired length of the sausages and the links are held in connected relation on a continuously moving conveyor while they are subjected to successive processing operations.

This application is a continuation-in-part of application Serial No. 36,445, filed June 15, 1960, now abandoned.

Apparatus has heretofore been developed for continuously processing link sausages which includes mechanism for automatically dividing a filled or stuffed casing into sections of predetermined length by constricting the casing at intervals to thereby form the stuffed casing into links, and mechanism for supporting the connected links in a continuous string on a series of longitudinally spaced, transversely extending linking bars carried on an endless conveyor which extends through a series of chambers having means therein for smoking and cooking the sausages with the links being adapted to be removed from the supporting cross bars when the latter emerge from the final processing chamber so that the links may be subsequently removed from the casing and packaged or otherwise prepared for market.

It is a general object of the present invention to provide in a sausage processing apparatus of the type described an improved mechanism for releasing or ejecting the connected sausages links from the supporting cross bars of the conveyor on which they are carried through the processing chambers.

It is a more specific object of the invention to provide an ejector apparatus for association with a continuous sausage processing apparatus which is mounted adjacent the conveyor on which the connected links are carried through the processing chambers which mechanism is located so as to be operative on the links as they emerge from the final processing chamber and which is so arranged that pressure laterally of the path of travel of the conveyor is applied to each successive link to force the still connected links out of engagement with the supporting members of the conveyor and free the same for subsequent skinning and packaging operations.

It is a further object of the invention to provide in an apparatus of the type described a turret mounted for rotation at one side of a run of the link carrying conveyor and having on its periphery a series of link engaging members which are moved by rotation of the turret across the path of the links so as to engage the links between the transversely extending link supporting bars on the conveyor and force them out of their normal path, thereby disengaging the links from the linking and gripping elements on the supporting bars.

It is a still further object of the invention to provide in a machine for continuously forming and processing link sausages wherein the sausages are transported in relatively long lengths of connected links through processing chambers on an endless traveling conveyor having longitudinally spaced cross bars which are notched to frictionally hold gathered sections of the casing between the links, an apparatus adjacent the final processing chamber for releasing the links from the cross bars which comprises link ejector plates mounted for radial movement on a transverse turret over which the upper run of the conveyor is draped and mechanism for moving the plates across the path of the conveyor in timed relation to the advancing movement thereof so as to engage the links adjacent the cross bars and force the same outwardly, thereby disengaging the gathered casing sections from the notches in the cross bars.

These and other objects and advantages of the invention will be apparent from a consideration of the several forms of the mechanism which are shown by way of illustration in the accompanying drawings wherein:

FIGURE 4 is a fragmentary vertical section taken on the line 4—4 of FIGURE 1;

FIGURE 5 is a vertical section taken on the line 5—5 of FIGURE 1;

FIGURE 6 is a vertical section, as in FIGURE 5, with the mechanism shown in a different position;

FIGURE 8 is a side elevation of a modified form of the link ejector mechanism;

FIGURE 9 is a fragmentary cross section taken on the line 9—9 of FIGURE 8, with portions broken away;

FIGURE 10 is a cross section taken on the line 10—10 of FIGURE 9, with portions broken away; and FIGURE 11 is a fragmentary cross section taken on the line 11—11 of FIGURE 8, to an enlarged scale.

Figure 1:
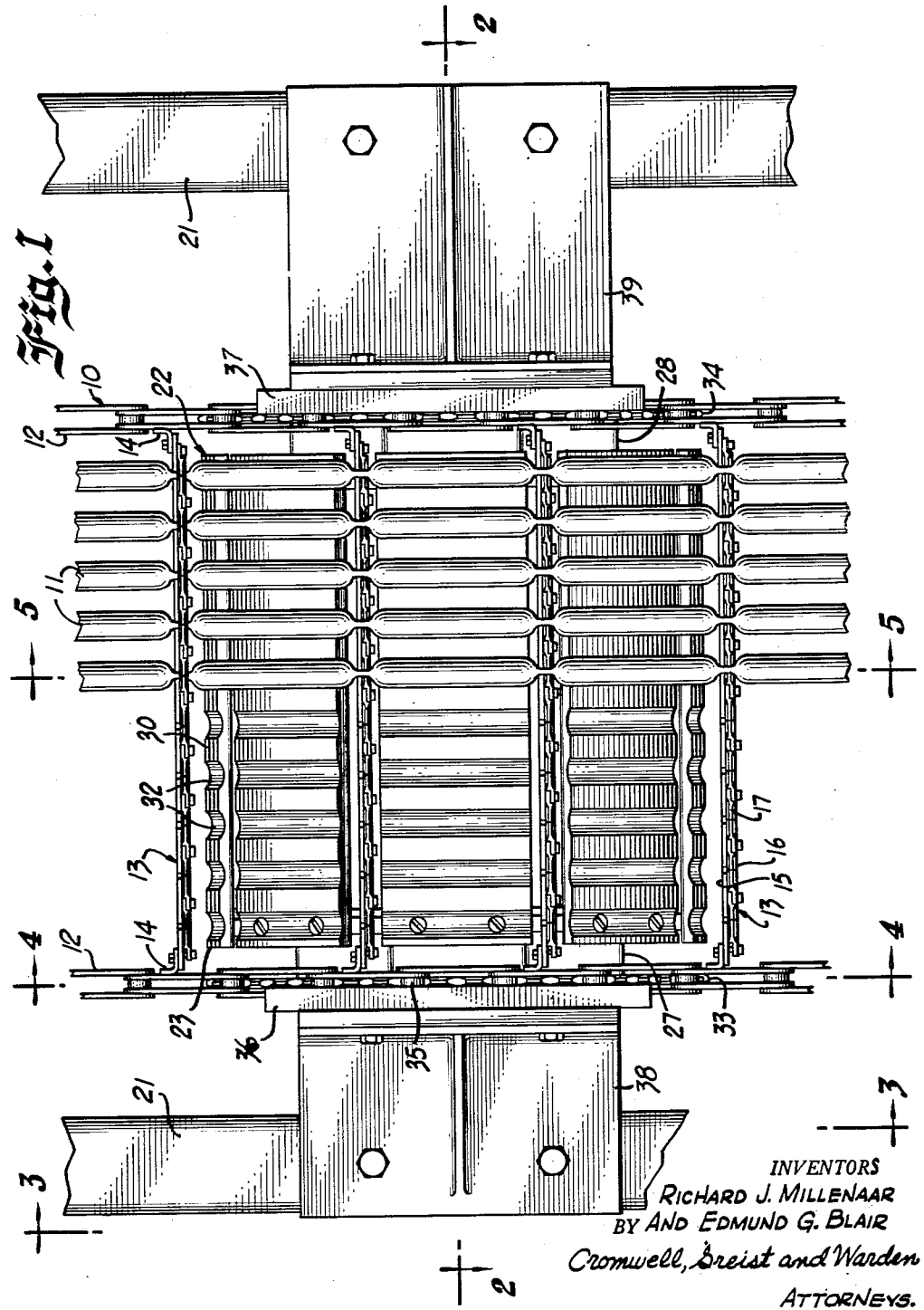
FIGURE 1 is a side elevation of a link ejector mechanism which embodies therein the principal features of the invention.

Referring first to FIGURES 1, 5 and 6, the apparatus of the invention is adapted to release from the carrying or supporting conveyor 10 the individual sausage links 11 in a plurality of lines of the links 11 which are, as shown in FIGURE 1, supported in parallel relation on the conveyor 10 while they are advanced through smoking and treating chambers (not shown) which process the sausages in a continuous, uninterrupted manner.

The link carrying conveyor 10 comprises a pair of laterally spaced side chains 12 (FIGURE 1) which are connected by longitudinally spaced link supporting cross bar assemblies 13, the latter extending between the two parallel chains 12 and being connected thereto by angle brackets 14 at opposite ends thereof. The link bar assemblies 13 (FIGURE 5) are spaced apart, in the direction of travel of the conveyor 10, a distance which provides the desired length for the links 10. The assemblies 13 which constitute a part of the mechanism for initially forming the links each comprise a supporting cross bar 15 and a series of spaced link forming and clamping plate elements 16. Each of the link forming and clamping elements 16 comprises a plate-like base of resilient or rubber-like material having an outwardly opening, generally V-shaped slot 17 which terminates at the bottom in a normally closed or restricted passageway 18 leading to a pocket formation 19. The pocket 19 is a relatively small diameter and is adapted to receive the constricted casing section 20 between each link 10 and the adjoining link. The casing is constricted between the links by forcing it downwardly in the V-shaped slot 17 and through the passageway 18 into the pocket 19 during the link forming operation. The casing sections 20 are thereafter retained in the pockets 19 during the movement of the links 10 through the processing so that each link 10 is frictionally held in the plane of the conveyor between a pair of cross bar assemblies 13 by engagement in pockets 19 of the constricted casing sections 20 between it and the next succeeding and preceding links. The chain conveyor 10 is suitably supported on a framework which includes the laterally spaced upright frame members or posts 21, portions of which are indicated in FIGURE 1.

Figure 2:
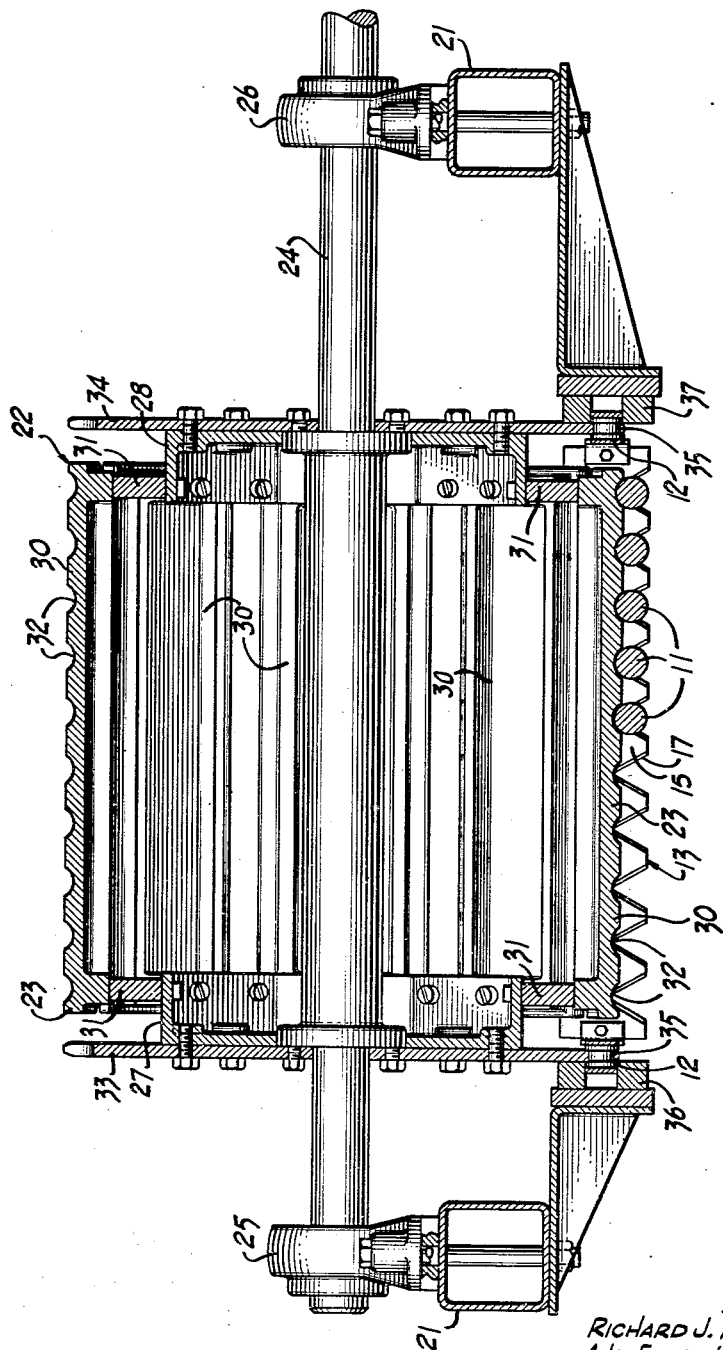
FIGURE 2 is a horizontal section taken on line 2—2 of FIGURE 1.
Figure 3:
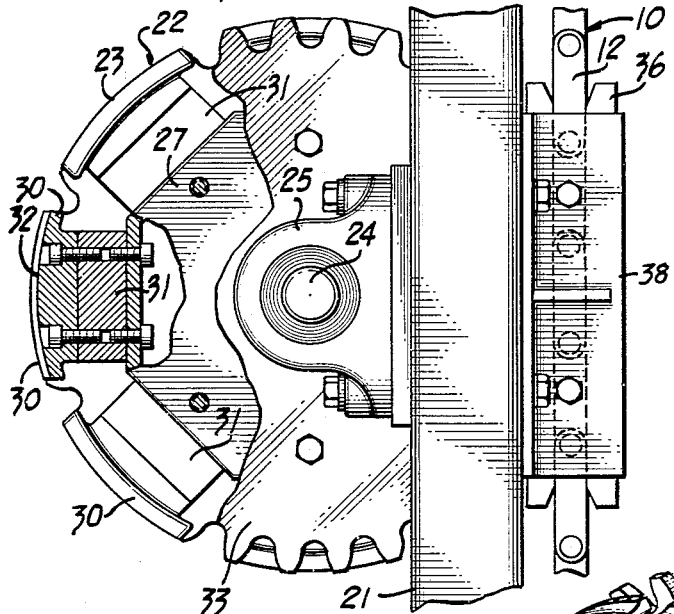
FIGURE 3 is a vertical section taken on the line 3—3 of FIGURE 1, with portions broken away.
Figure 7:
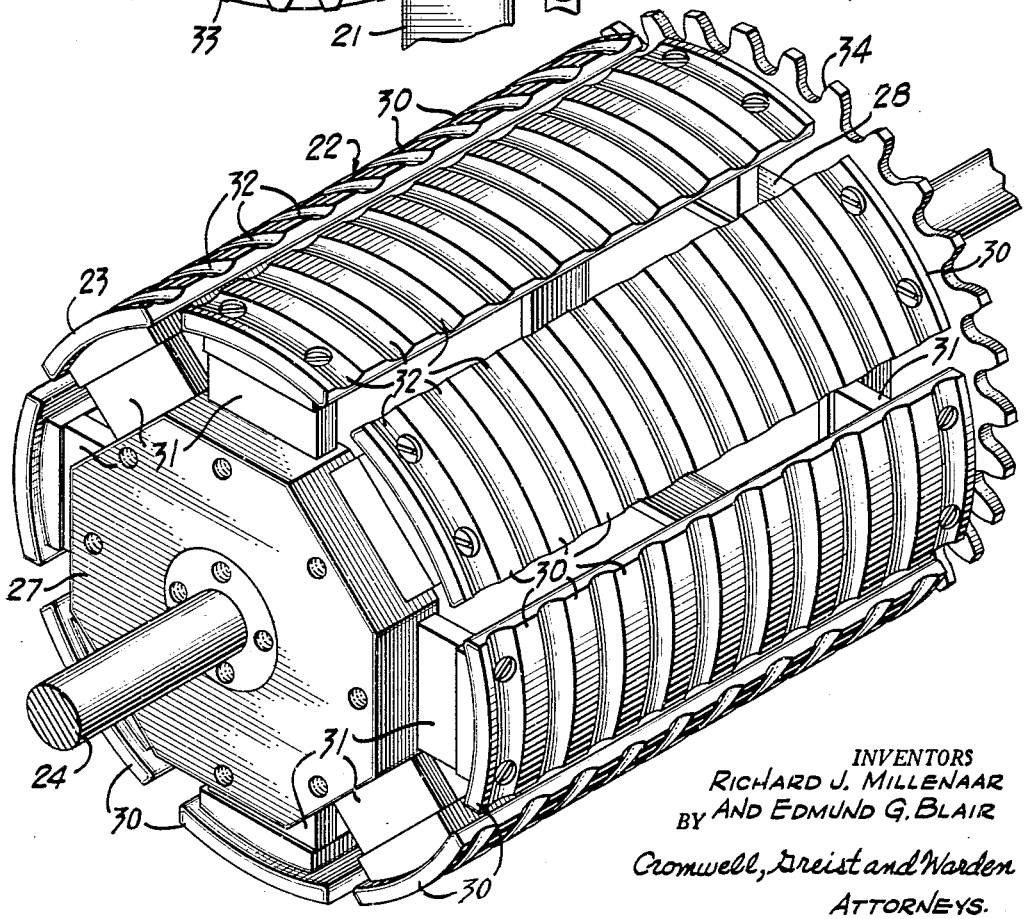
FIGURE 7 is a fragmentary perspective view of a portion of the mechanism.

The link releasing or ejecting apparatus 22 (FIGURE 2) is mounted adjacent a vertical run of the conveyor 10 on the frame members 21. It comprises a wheel or turret member 23 which is rotatably supported by means of a horizontal supporting shaft 24. The shaft 24 is journaled in a pair of bearing brackets 25 and 26 which are mounted on laterally spaced, vertically extending frame posts 21. The turret member 23 comprises a pair of hub-like end members 27 and 28 which are secured in spaced relation on the shaft 24. The end members 27 and 28 are of octagonal shape providing peripherally spaced faces 29 which are in paired or axially aligned relation and which are adapted to support thereon a plurality of link ejector bars 30. Each of the ejector bars 30 is bolted at its ends to the respective hub members 27 and 28 through spacer blocks 31. Each ejector bar 30 has on its outside face a series of grooves 32 which are spaced across the ejector bar 30 a distance corresponding to the spacing of the lines of links 11 on the conveyor 10 and the grooves 32 in each ejector bar 30 are aligned with the corresponding grooves 32 in the adjacent ejector bars 30 so as to travel in circular paths around the turret or drum 23. The ejector bars 30 each have a width or a dimension in the direction of the circumference of the turret 23 which is approximately the length of the sausage links 11 and is somewhat less than the distance between adjoining cross bar assemblies 13 on the conveyor 10. The ejector bars 30 are arranged so that there is sufficient space between the side edges of each bar 30 and the adjacent bars to accommodate the links supporting assemblies 13 when the turret 23 is traveling with the conveyor 10. As shown in FIGURES 5 and 6, the supporting shaft 24 for the turret 23 is located relative to the vertical plane in which the conveyor 10 is traveling so that each ejector bar 30 moves across the path of the links 11 carried in the conveyor 10 as the turret 23 is rotated in timed relation to the movement of the conveyor chains 12 and forces the links out of the plane of their normal path of movement so as to disengage them from the conveyor 10 as illustrated in FIGURES 5 and 6.

The turret 23 is driven in timed relation to the movement of the conveyor 10 by means of plate sprockets 33 and 34 which are attached to the turret end members 27 and 28. The sprockets 33 and 34 are of sufficient diameter and have the proper tooth spacing to engage in driving relation with the cross pins 35 on the conveyor chains 12 so as to form a driving connection between the traveling chains 12 and the sprockets 33 and 34 which insures proper timing of the rotation of the turret 23 relative to the conveyor 10 and avoids any interference between the cross bar assemblies 13 and the ejector bars 30.

The chains 12 of the conveyor 10 are guided in a vertical plane and held against movement laterally of the same where the ejector apparatus 22 is located by a pair of guideway forming brackets 36 and 37 which are supported on angle brackets 38 and 39 attached to the vertical frame members 21. The guide brackets 36 and 37 extend vertically in parallel relation and provide the guideways for receiving the links on the chains 12 so as to hold the chains 12 against any lateral movement due to the pressure exerted on the sausage links 10 by the engagement of the ejector bars 30 with the same.

The operation of the mechanism will be obvious from the description thereof. As shown in FIGURES 5 and 6, the sprockets 33 and 34 are mounted on the hub members 27 and 28 so the turret 23 is driven by the chains 12 with the ejector bars 30 being spaced about the periphery of the turret so that as the turret rotates each succeeding sausage link 11 in each line thereof is engaged by an ejector bar and progressively move out of its normal path which forces each successive connecting casing section 20 out of the retaining pocket 19 in the clamping element 16 on the link supporting assembly 13. The connected links 11, when freed from the conveyor 10, are delivered to a skinning and packaging apparatus (not shown) or otherwise collected for removal from the processing apparatus.

A modified form of the ejector mechanism is illustrated in FIGURES 8 to 11. The link supporting conveyor 40 is similar to the conveyor 10 and carries a plurality of parallel lines of sausage links 41 on a pair of laterally spaced side chains 42 which are connected by longitudinally spaced link supporting cross bar assemblies 43, the latter being connected at opposite ends of the parallel chains 42 by bracket forming end flanges 44.

The link holding cross bar assemblies 43 each comprise a supporting plate 45 having a plurality of transversely spaced, outwardly opening V-shaped notches 46 in the outermost edge thereof and a cover member 47 of resilient or rubber-like material having outwardly opening V-shaped notches 48 which correspond in spacing with the notches 46. The cover member 47 partially encases the support plate 45 and the notches 48 each terminate at the bottom in a normally closed or restricted passageway 49 leading to a pocket formation 50, the latter being of relatively small diameter and being adapted to receive the constricted casing section 51 between each link 41 and the adjoining links. The casing is constricted and the links are carried by the conveyor 40 in the same manner as described with reference to conveyor 10.

The link releasing or ejecting mechanism 52 is mounted at the end of the processing chambers so that the upper run of the conveyor 40 is draped over the ejecting turret or wheel member 53, the latter being rotatably supported on a horizontal shaft 54 which extends between a pair of cam forming end plates 55. The end or cam plates 55 are mounted for vertical adjustment on pairs of spaced vertical frame members 56 which constitute part of the frame structure of the main machine. Vertically disposed adjusting screws 57 are mounted in bearing brackets 58 secured to the main frame of the machine and have their upper ends engaging in sockets 59 provided in the bottom edge faces of the cam plates 55 so that vertical adjustment of the entire ejector mechanism 52 is provided for. The shaft 54 supports in rotatable relation thereon the turret 53 which includes end plates 60 and ring-like sprocket members 61, the latter being mounted on the inside faces of the end plates 60 and these assemblies being mounted on opposite ends of a sleeve-like hub 62 supported at its ends by bearings 63 on the ends of the shaft 54.

The end plates 60 have circumferentially spaced slots 64 which extend in a generally radial direction and constitute guideways for receiving in sliding relation therein slide members 65 at opposite ends of ejector forming cross bar assemblies 66. The slide members 65 are provided on their outermost faces with cam rollers 67 mounted on supporting pins 68 and operating in cam tracks 69 in the inner faces of the cam plates 55. Each ejector forming cross bar assembly 66 includes the support forming cross bar 70 extending between the slide members 65 in parallel relation with the shaft 54 and in a generally radial plane with an ejector plate 71 and a sausage end support member 72, mounted on the trailing face thereof and a sausage end support member 73 mounted on the leading face thereof. The ejector plate 71 is provided with notches 74 which are V-shaped and open outwardly of the outer edge of the plate 71. The notches 74 are spaced transversely of the plate 71 so as to fall in alignment with the notches 48 in the cross bar assemblies 43. The notches 74 have a shallower depth than the notches 48 and their side edges are approximately parallel with the side edges of the notches 48. The outermost edge of the ejector plate 71 is slightly bent as shown at 75 in the direction away from the plane of the support plate 70. The sausage end support plates or bars 72 and 73 are relatively thick and have spaced concave recesses 76 in their outermost edges which are aligned with the V-shaped notches 74 in the corresponding edge of the associated ejector plate 71. The ejector assemblies 66 are spaced circumferentially of the turret so that the ejector plate 71 and the sausage end support bar 72 moves along the trailing side or face of a cross bar assembly 43 as shown in FIGURE 10 while the associated sausage end support bar 73 moves along the leading side or face of the cross bar assembly when the ejector assembly 66 is moved outwardly.

Chain guides in the form of vertically disposed plates 77 are attached to the supporting frame structure so as to hold the chains 40 in their circular path around the uppermost portion of the path traversed by the turret while the links 41 are freed from the cross bar assemblies 43.

In operation, the side chains 42 of the conveyor 40 are engaged with the sprockets 61 and carry the cross bar assemblies 43, with the links 41 held therein, around the top portions of the periphery of the turret 53. The cam tracks 69 are arranged so as to move the ejector plate assemblies 66 radially outwardly towards the chain 40 as the latter advances over the top of the turret 53 so as to engage the connecting casing portions 51 between the ends of successive links 41 in the notches 74 of the ejector plates as the latter move outwardly through the path of the chains thereby forcing the connection casing sections 51 out of the pockets 50 and through the slots 49 which frees the links 41 from the cross bar assemblies 43. The ends of the links 41 are supported in the pocket forming recesses in the outer edges of the support bars 72 and 73 while the casing sections 51 are engaged by the plate 71 so as to prevent tearing or damage to the links. The return run of the conveyor 40 follows the inclined path indicated in FIGURE 8 and the freed lines of links separate therefrom as shown.

While particular materials and specific details of constructions have been referred to in describing the illustrated forms of the invention, it will be understood that other materials and different details of construction may be resorted to within the spirit of the invention.

We claim:

1. In an apparatus for handling link sausages wherein a plurality of lines of connected links are supported on a traveling conveyor with each link connected to the adjoining links by a constricted casing section which is frictionally held in a pocket at the bottom of one of a plurality of casing constricting slots in a cross bar assembly on the conveyor, a mechanism for moving the casing sections connecting the sausage links out of the pockets in the cross bar assemblies of the conveyor which mechanism comprises a turret rotatably mounted adjacent a generally vertical run of the conveyor on an axis which is radially spaced a predetermined distance from the path of the conveyor, a plurality of link engaging ejector bar members mounted in spaced relation about the periphery of said turret and parallel with the axis of rotation thereof, said ejector bar members having circumferentially extending outwardly opening grooves in their peripheral faces which grooves are spaced apart according to the spacing of the lines of connected links and said ejector bar members being spaced on the turret in the radial direction a greater distance than the distance the axis of the turret is spaced from the path of the conveyor whereby the ejector bar members travel in a path which passes through the plane in which the links carried on the conveyor will normally travel while traversing said vertical run and means for rotating the turret so that said ejector bar members engage successive links in each of the lines thereof in the grooves in said ejector bar members and progressively move the links out of their normal path, thereby successively forcing the constricted casing sections which connect the leading and trailing ends of each link with the adjoining links laterally of the plane of movement of the conveyor and out of the restraining pockets on the link supporting bar assembly while supporting intermediate portions of the links and disengaging the links from the conveyor.

2. In an apparatus for handling link sausages wherein lengths of connected links are supported on a traveling conveyor with each link connected to an adjoining link by a constricted casing section and with each constricted casing section frictionally held in a pocket in a link supporting cross bar assembly on the conveyor, a mechanism for ejecting the casing sections connecting the sausage links out of the pockets in the cross bar assemblies of the conveyor which mechanism comprises a turret rotatably mounted on an axis which is adjacent to and parallel with the plane of operation of a run of the link carrying conveyor, and spaced therefrom a predetermined distance, said turret having peripherally spaced link engaging ejector members, said ejector members having outwardly opening link receiving grooves in their peripheral faces which extend circumferentially of the turret and which approximate the length of the links, said ejector members being circumferentially spaced about the periphery of the turret and the axis of rotation of said turret being radially spaced from the path of the conveyor a lesser distance than the path of the ejector members, and means for rotating the turret so that said bar assemblies are received between successive ejector members and said ejector members engage each successive link at its leading end and progressively force the link out of its normal path and laterally of said conveyor run, thereby pulling the constricted casing section which connects the link with the adjoining link out of the pocket on the link supporting cross bar assembly and disengaging each succeeding link from the conveyor.

3. In an apparatus for handling connected link sausages wherein the links are supported in connected lengths on a traveling chain conveyor with each link connected to the adjoining links by a constricted casing section and with each said constricted casing section frictionally held in a pocket at the bottom of an outwardly opening casing constricting slot in one of a series of longitudinally spaced cross bar assemblies on the conveyor, a mechanism for ejecting the casing sections connecting the sausage links from the pockets in the cross bar assemblies of the conveyor which mechanism comprises a turret rotatably mounted adjacent the inner side of a run of the link carrying conveyor on a cross shaft which is parallel with the plane in which said cross bar assemblies move, said turret having peripherally and axially spaced link engaging members, which members have in their outer faces outwardly opening grooves extending circumferentially of the turret, said link engaging members having a circumferential length approximating the length of the links and the transverse curvature thereof for accommodating the links, said link engaging members being spaced in the radial direction from the supporting cross shaft a greater distance than the path of movement of the links on the conveyor, and means to rotate said turret in timed relation to the movement of the conveyor chain so as to engage each successive link in a groove in a link engaging member and progressively force the same laterally of the plane of movement of the cross bar assemblies thereby pulling the constricted casing sections which connect the link with adjoining links out of the pockets on the cross bar assemblies in which they are held so as to disengage succeeding links from the conveyor.

4. In an apparatus for handling connected link sausages wherein the links are supported on a traveling conveyor with each link connected to the adjoining links by a constricted casing section and with each constricted casing section engaged in a pocket in one of a series of cross bar assemblies which are in longitudinally spaced relation on the conveyor so that the connected links extend in a lengthwise direction in the plane of the conveyor and are frictionally retained thereon solely by engagement of the constricted casing sections in the pockets of the cross bar assemblies, a mechanism for forcing the casing sections which connect the sausage links out of the pockets in the cross bar assemblies, said mechanism comprising a turret rotatably mounted on an axis which is adjacent to and parallel with the path of travel of the link conveyor, peripherally spaced link engaging ejector members carried on said turret, means adjacent the turret forming a guideway for the traveling conveyor to hold it in a predetermined path, said ejector members having peripheral faces which are positioned to engage the links adjacent the constricted casing sections which connect the ends of the adjoining links, said ejector members being located in the radial direction on the turret a distance which is greater than the distance the axis of the turret is located from the path of the conveyor as it advances in said predetermined path and means for rotating the turret thereby to engage the ejector members with successive links and force the constricted casing sections out of the pockets in which they are held on the link supporting bar assemblies and to free the links for removal from the conveyor.

5. In an apparatus for handling connected link sausages wherein the links are supported on a traveling conveyor with each link connected to the adjoining links by a constricted casing section and with each constricted casing section engaged in a pocket in one of a series of cross bar assemblies which are mounted in longitudinally spaced relation on the conveyor with the pockets opening in a direction laterally of the plane of operation of the conveyor so that the connected links extend in a lengthwise direction in the plane of the conveyor and are frictionally retained thereon, a mechanism for forcing the casing sections connecting the sausage links out of the pockets in the cross bar assemblies of the conveyor, which mechanism comprises a turret rotatably mounted on an axis which is adjacent to and parallel with a portion of the path of travel of the link conveyor and having circumferentially spaced link engaging ejector members extending parallel with the axis of rotation of said turret and between the ends of the turret, said turret having end plates with guideway forming slots which extend in a generally radial direction, and the link ejector members having slides at opposite ends thereof which are mounted for generally radial movement in the slots in the end plates, said ejector members having outwardly opening, generally V-shaped slots in their outer margins where are spaced between the turret end plates so as to correspond to the spacing of the lines of links carried by the cross bar assemblies, means for moving the slide plates in the slots as the turret rotates so as to reciprocate the ejector members, and means adjacent the turret forming a guideway for the traveling conveyor to hold said conveyor in a predetermined path which is radially spaced a lesser distance from the axis of the turret than the path of the ejector members when moved outwardly of the axis of the turret, whereby the ejector members will engage the constricted casing sections between the ends of the links and force the same out of the pockets in which they are held on the link supporting bar assemblies thereby to free the casing sections from the conveyor.

6. In an apparatus for handling connected link sausages wherein the links are supported on a traveling conveyor with each link connected to the adjoining links by a constricted casing section and with each constricted casing section engaged in a pocket in one of a series of cross bar assemblies which are mounted in longitudinally spaced relation on the conveyor with the pockets opening in a direction laterally of the plane of operation of the conveyor so that the connected links extend in a lengthwise direction in the plane of the conveyor and are frictionally retained thereon, a mechanism for forcing the casing sections connecting the sausage links out of the pockets in the cross bar assemblies of the conveyor, which mechanism comprises a turret rotatably mounted on an axis which is adjacent to and parallel with a portion of the path of travel of the link conveyor and having link engaging ejector members extending between the ends of the turret and spaced circumferentially about the same, said turret having end plates with guideway forming recesses extending in a generally radial direction and spaced circumferentially of the turret, said link ejector members having slides at the opposite ends thereof which are mounted for generally radial movement in pairs of axially aligned recesses in the end plates, said ejector members having outwardly opening, generally V-shaped slots in their outer margins which are spaced so as to correspond to the spacing of the lines of links carried by the cross bar assemblies, cam rollers on said slides and means providing a fixed cam track for co-operation with said cam rollers to move the slide plates and reciprocate the ejector members, and means adjacent the turret forming a guideway for the traveling conveyor which holds it in a predetermined path whereby the ejector members are moved outwardly of the axis of the turret, when the turret is rotated, to a position which is radially spaced a greater distance from the axis of the turret than the path of the conveyor so that the ejector members will engage the constricted casing sections at the ends of the links and force the same out of the pockets in which they are held on the link supporting bar assemblies thereby to free the casing sections from the conveyor.

7. In an apparatus for handling connected link sausages wherein a plurality of lines of connected links are supported on a traveling conveyer with each link connected to the adjoining links by a constricted casing section and with each constricted casing section frictionally engaged in an outwardly opening pocket forming slot in one of a series of cross bar assemblies which are in longitudinally spaced relation on the conveyor so that the connected links extend lengthwise in the direction of movement and in the plane of the conveyor and are frictionally retained thereon, a mechanism for forcing the casing sections connecting the sausage links out of the slots in the cross bar assembly conveyor so as to free the same for separation from the conveyor which mechanism comprises a rotatably mounted turret supported on an axis which is parallel with a portion of the path of travel of the link carrying conveyor and spaced a predetermined distance therefrom, said turret comprising end plates having aligned pairs of guideway recesses which extend in a generally radial direction therein, slide members mounted for reciprocation in said guideway recesses, link engaging ejector members carried between each pair of aligned slide members, which ejector members comprise an ejector plate with outwardly-opening V-shaped slots in its outer margin and a pair of relatively thick link end supporting bar members mounted in spaced parallel relation adjacent each of the casing engaging ejector plate members, said bar members having sausage end engaging pockets in their outer edges, guide means for holding the link carrying conveyor in a predetermined path extending around a portion of the periphery of the turret, cam means associated with the turret and the slide plates for moving the slide plates in a generally radial direction relative to the axis of the turret so as to position the ejector plate members a greater distance from the axis of the turret than the path of the conveyor whereby to engage the constricted casing sections between the sausage links in the slots in the ejector plate members.

References Cited in the file of this patent
UNITED STATES PATENTS

| | | |
|---|---|---|
| 2,724,485 | Reading | Nov. 22, 1955 |
| 2,761,541 | Adams | Sept. 4, 1956 |